3 Sheets—Sheet 1.

H. H. WESTINGHOUSE.

Assignor to the WESTINGHOUSE MACHINE COMPANY.

STEAM ENGINE.

No. 10,603. Reissued May 26, 1885.

Witnesses:
J. Thornton Bell
R. M. Clark

Inventor:
H. Herman Westinghouse,
by George H. Christy Atty

3 Sheets—Sheet 2.

H. H. WESTINGHOUSE.

Assignor to the WESTINGHOUSE MACHINE COMPANY.

STEAM ENGINE.

No. 10,603. Reissued May 26, 1885.

Witnesses:
J. Thorden Pell
C. M. Clarke.

Inventor:
H. Herman Westinghouse,
by George H. Christy, Atty.

3 Sheets—Sheet 3.

H. H. WESTINGHOUSE.

Assignor to the WESTINGHOUSE MACHINE COMPANY.

STEAM ENGINE.

No. 10,603. Reissued May 26, 1885.

Witnesses:
Thomas Ball.
H. M. Clarke.

Inventor:
H. Herman Westinghouse
by George H. Christy Atty.

UNITED STATES PATENT OFFICE.

H. HERMAN WESTINGHOUSE, OF NEW YORK, N. Y., ASSIGNOR TO THE WESTINGHOUSE MACHINE COMPANY, OF PITTSBURG, PENNSYLVANIA.

STEAM-ENGINE.

SPECIFICATION forming part of Reissued Letters Patent No. 10,603, dated May 26, 1885.

Original No. 303,083, dated August 5, 1884. Application for reissue filed May 2, 1885.

*To all whom it may concern:*

Be it known that I, H. HERMAN WESTINGHOUSE, a citizen of the United States, formerly residing at Pittsburg, in the county of Allegheny and State of Pennsylvania, but now of the city of New York, in the county and State of New York, have invented a certain new and useful Improvement in Steam-Engines, of which improvement the following is a specification.

Figure 1:
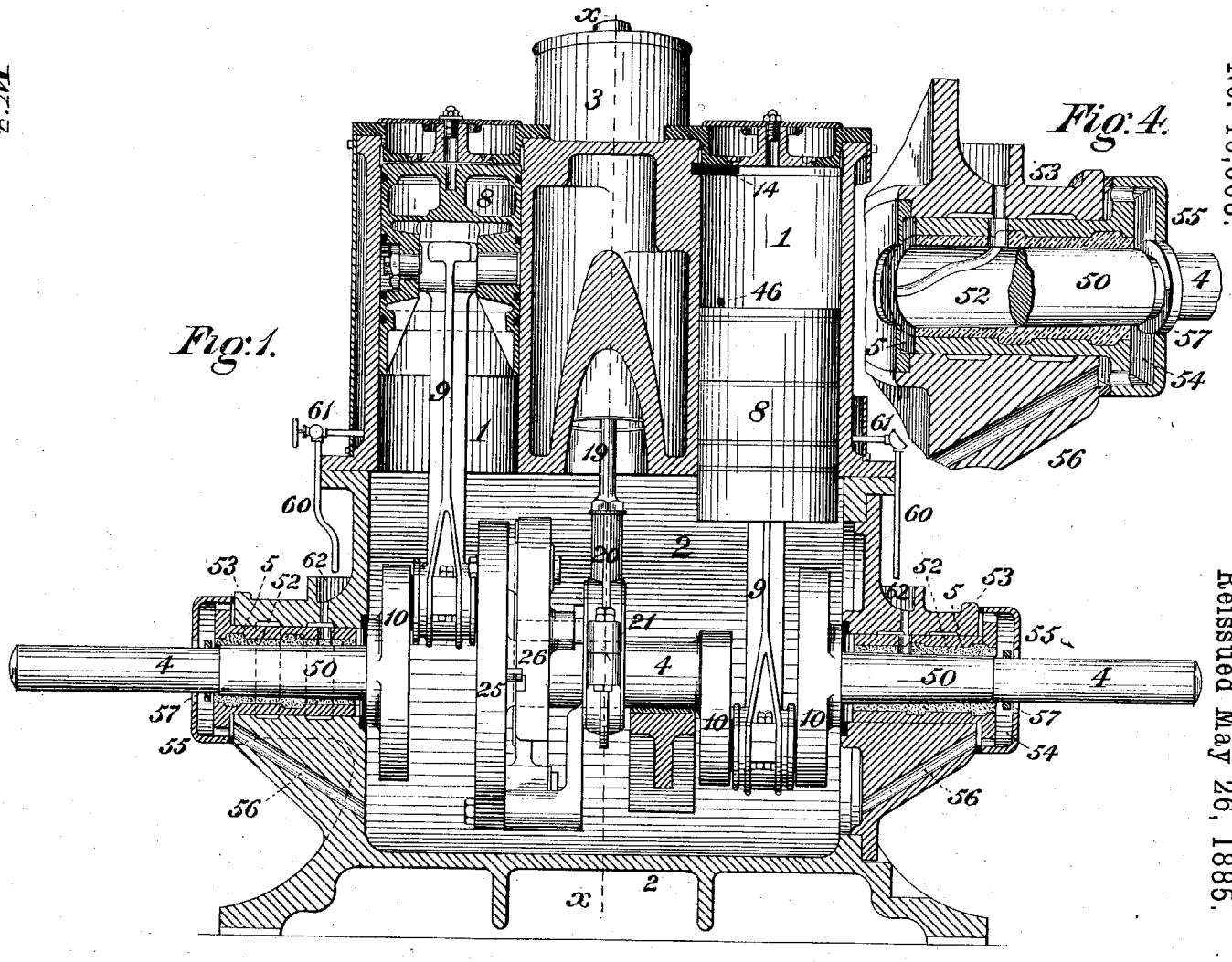
Figure 2:
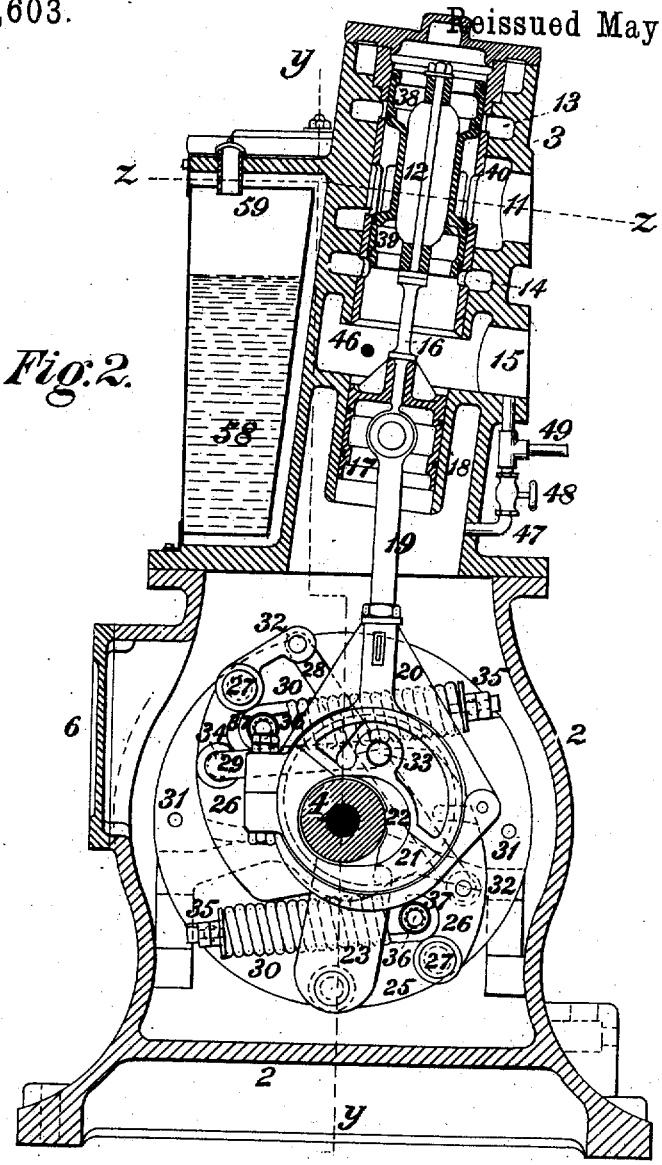
Figure 3:
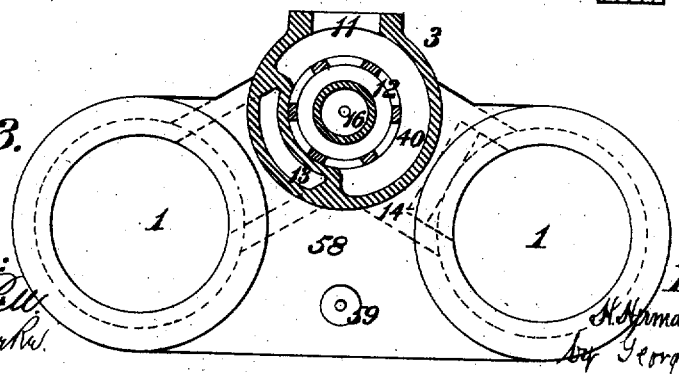
Figure 5:
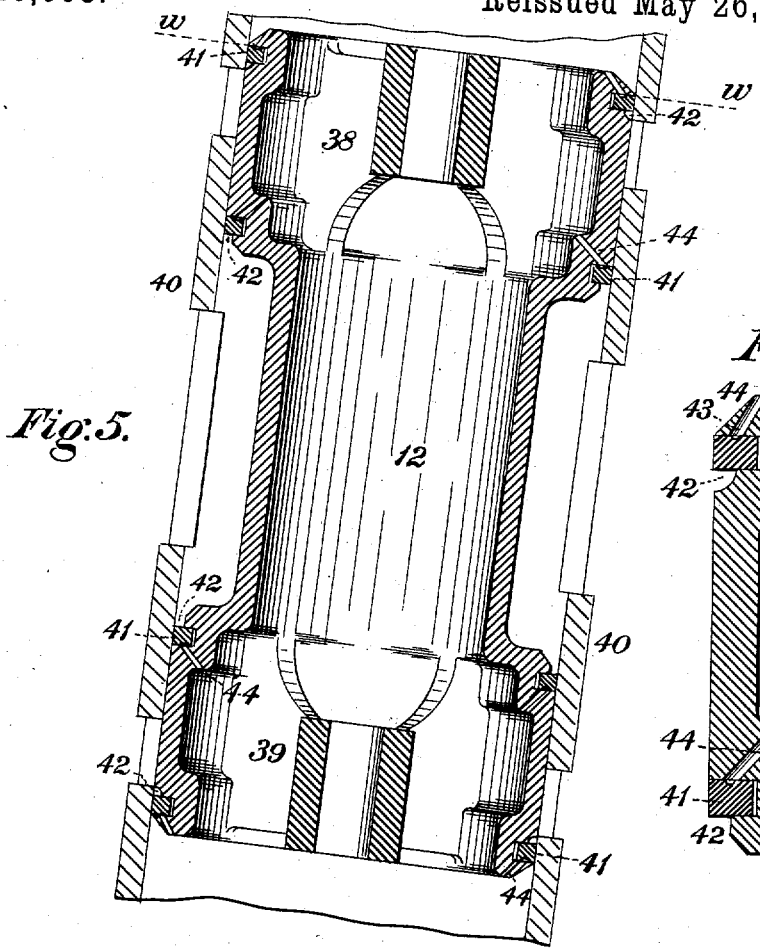
Figure 7:
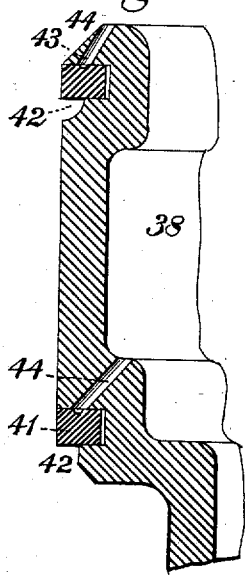
Figure 6:
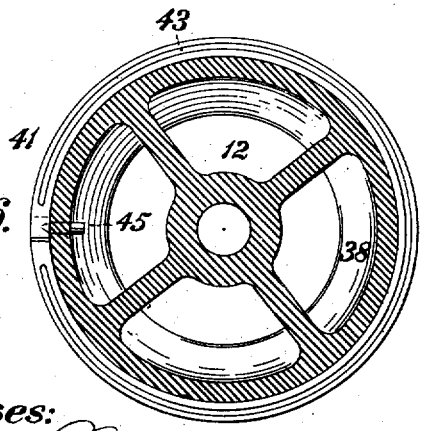
Figure 8:
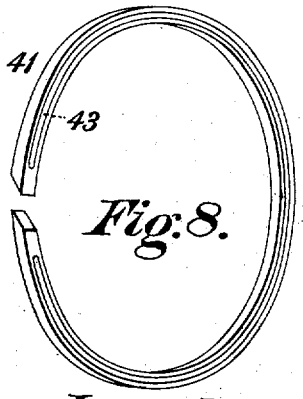

In the accompanying drawings, which make part of this specification, Figure 1 is a vertical longitudinal section through a steam-engine embodying my invention at the line *y y* of Fig. 2; Fig. 2, a vertical transverse section through the same at the line *x x* of Fig. 1; Fig. 3, a horizontal section at the line *z z* of Fig. 2; Fig. 4, a vertical section, in perspective and on an enlarged scale, through one of the crank-shaft bearings; Fig. 5, a vertical longitudinal central section through the main valve; Fig. 6, a transverse section through the same at the line *w w* of Fig. 5; Fig. 7, a longitudinal section, on an enlarged scale, through a portion of the main valve; and Fig. 8, a view in perspective of one of the packing-rings of the main valve detached.

My present invention relates to steam-engines of the class having two vertical single-acting cylinders, the pistons of which are connected to opposite crank-pins and are governed by a common main or distribution valve, as exemplified in Letters Patent of the United States No. 240,482, granted and issued to me under date of April 19, 1881.

It is the object of my invention to provide a simple, durable, and effective automatic cut-off engine, embodying, in connection with the general features of construction above mentioned, novel and improved means for effecting regulation of speed by variations in degree of expansion, balancing the weight of moving parts of valve and regulating mechanism, preventing steam-leakage between the distribution-valve and its case, maintaining continuous lubrication during operation, and relieving the cylinders from water of condensation which may gain access thereto.

The improvements claimed are hereinafter fully set forth.

In the practice of my invention two vertical single-acting steam-cylinders, 1 1, are secured to the top of a crank-case, 2, upon opposite sides of an interposed valve-chamber, 3, the axis of which is inclined at a slight angle relatively to the central plane of the cylinders 1 1. The crank-case 2 serves as the bed or support of the engine, and also as a tank or receptacle for the lubricating material of the crank-pins and the journals of the crank-shaft 4, which rotate in bearings 5 5, secured in the ends of the case 2. Access to the cranks may be had when required by the removal of a bonnet, 6, on the side of the crank-case, and additional support is afforded to the crank-shaft by a center bearing, 7. The cylinders 1 1 are open at their lower ends, and are fitted with long pistons 8 8 of the trunk class, which are coupled by connecting-rods 9 9 with crank-pins set oppositely, or at an angle of one hundred and eighty degrees, upon a pair of double cranks, 10 10, on the crank-shaft 4. Steam is supplied to the valve-chamber 3 by a proper steam-pipe connected to the opening or nozzle 11 therein, and is admitted to and exhausted from the cylinder-spaces above the pistons 8 by a main or distribution valve, 12, which is composed of an upper piston, 38, and a lower piston, 39, connected by a hollow or tubular body portion, and is reciprocated in the valve-chamber 3, so as to open, by the movements of its end pistons, ports 13 14, leading from the valve-chamber to the upper ends of the cylinders 1 1 alternately to the steam-supply nozzle 11, and to a lower exhaust-passage, 15, in the valve-chamber, to which the exhaust-pipe is connected. The valve 12 is secured upon a valve-stem, 16, the lower end of which carries a packed guide-piston, 17, which works in an open-ended guide-cylinder, 18, projecting downwardly from a transverse partition within the chamber 3, and is coupled by an eccentric-rod, 19, to the strap 20 of an eccentric, 21, on the crank-shaft 4.

The construction of the engine in the particulars above set forth, which accords generally with that of my Letters Patent No. 240,842, aforesaid, is not claimed as of my present invention, the specific features of improvement of which, as applied in an engine of such character, will now be severally described.

Referring, first, to the distribution-valve 12 and its operating mechanism, in lieu of employing a fixed eccentric, by which only a determined degree of expansion is effected, as in my prior construction, the eccentric 21 is adapted to be moved transversely to the crank-shaft 4, with which it rotates, so as to cut off steam from the cylinders 1 1 at earlier or later periods of the stroke of their pistons 8 8 by reduction or increase, respectively, of the travel of the valve 12, in accordance with variations in the position of the eccentric relatively to the line of the cranks. To effect such variation in manner and degree proper to maintain a uniform determined speed of the engine, the eccentric 21 is fitted freely on the crank-shaft 4 by being provided with a slot, 22, the dimensions of which are such as to admit of the required degree of transverse movement, and is connected directly to a centrifugal governor or regulator fixed upon the crank-shaft 4, and located between the inner arms of the double cranks 10 10 thereof. Such connection is effected, preferably, by pivoting an arm, 23, on the eccentric 21 to a pin, 24, fixed in a governor-disk, 25, which is formed upon or secured to one of the inner crank-arms, 10, and carries a centrifugal governor of any suitable and preferred construction. In the governor herein illustrated weights 26 are pivoted by pins 27 to the disk 25, and are connected, so as to move coincidently outwardly within a range limited by stops 31 under the influence of centrifugal force, by a link, 28, the ends of which are pivoted by pins 32 to the weights. The weights 26 are moved inwardly by the centripetal action of helical springs 30, connected at one end to blocks or standards 35 on the weights, and at the other by pins 36, having sleeves or bushings 37, to the disk 25, and the transverse movements of the eccentric 21, in accordance with the outward and inward movements of the weights, are effected by a link, 29, coupled at one end to a pin, 33, on the eccentric, and at the other to a pin, 34, on one of the weights 26 between its pivot and its outer end. The specific construction of governor above described is not, however, claimed herein, the same being fully set forth in Letters Patent No. 303,085, to myself and Arthur G. Brown, dated August 5, 1884.

By combining, as above set forth, a centrifugal governor, located between the cranks of a double-cylinder single-acting engine, with a movable eccentric actuating a distribution-valve common to both cylinders, all rock-shafts and intermediate connections are dispensed with, the action of the governor is transmitted directly to the eccentric, and thence to the valve, and the moving parts of the regulating mechanism are insured proper and continuous lubrication during operation, and fully protected from the access of dust, grit, and other foreign matters.

It will be seen that by reason of the substantially vertical position of the main valve 12 and its guide-piston 17 the gravity of said members, added to that of the eccentric, tends to resist the upward and accelerate the downward movement of the valve, and to counteract such tendency and balance the weight of parts the upper piston, 38, of the valve is made of larger diameter than the lower piston, 39, the sleeve or bushing 40 of the valve-chamber, within which the valve works, being bored out correspondingly. The difference of diameter between the upper and lower pistons is such that the tendency to upward movement, induced by the excess of steam-pressure upon the upper piston, shall be equal, as nearly as may be, to the downward tendency of the gravity of the valve and eccentric, which, being thus balanced, will be correspondingly more sensitive to the action of the governor in varying the point of cut off.

The pistons 38 and 39, which constitute the bearing-surfaces of the main valve 12, are packed by split rings 41, of metal, which are sprung into circumferential recesses in the pistons, and, as heretofore constructed, have been without provision for insuring a tight bearing longitudinally upon their seats in the pistons, as is desirable in preventing leakage of steam past the pistons and preventing undue friction.

The requisite tightness of the packing-rings is assured in the construction herein illustrated by forming circumferential grooves 42 in the pistons 38 and 39 on the steam side of each packing-ring 41, so as to expose a portion of one of the sides of each ring to the pressure of the steam in the chamber and placing the opposite sides of the rings in communication with the exhaust-passage through the center of the valve, such communication being effected by forming a channel, 43, on the exhaust side of each ring, above one or more openings, 44, leading through the metal of the piston from the adjacent seat of the ring to the inside of the piston, as shown in Figs. 5 and 7. The rings are thus held to their seats by the pressure of the steam upon an area equal to that of the channels 43, and consequently move with the valve as if made solid therewith without tendency to release or relief by such movement of their outward bearing upon the lining 40 of the valve-chamber. The rings 41 should be fixed as against rotation upon their pistons, to prevent steam blowing through their joints into the openings 44, by dowel-pins 45, or in any other suitable manner.

The preferred construction of the packing-rings and recesses, as above described, does not, *per se*, constitute part of the invention herein claimed, and the same is fully set forth in my Letters Patent No. 303,084, dated August 5, 1884.

In order to provide for the escape of water of condensation which may find access to the cylinders 1, a relief port or channel, 46, is formed in the body of each cylinder, leading from the bore thereof to the exhaust-passage 15, said ports opening into the cylinders at such level as to be uncovered by the pistons 8 when at the lower extremities of their stroke, and thereby to permit the discharge into the exhaust-passage of any water of condensation that may be present in the cylinder before the next upward stroke of the piston. A drain-pipe, 47, provided with a cock or valve, 48, to prevent blowing through of exhaust-steam, is led from the exhaust passage 15 to the crank-case 2, or to the lower portion of the valve-chamber 3, and serves, by discharging water of condensation from the exhaust into the crank-case, to relieve the exhaust-pipe therefrom, as well as to assist in maintaining the proper level of the lubricating mixture of oil and water in the crank-case. A discharge-pipe, 49, may be connected to the pipe 47 above the valve 48, to carry off any surplus of water above that which may be needed to maintain a desired level in the crank-case. The journals 50 of the crank-shaft 4, which are preferably tapered from their inner to their outer ends, as seen in Fig. 1, rotate in cylindrical bearings 5, provided with Babbitt metal linings 52, and secured in sockets or supports 53, projecting outwardly from the ends of the crank-case 2. Chambers 54, for the reception of lubricating material, are formed at the outer ends of the journals 50 by caps 55, fitting freely over the crank-shaft 4, and secured to the end flanges of the bearings 51, and passages 56 extend from the bottoms of the chambers 54 to the crank-case. Rings or wipers 57, secured to the crank-shaft, and rotating therewith within the chambers 54, serve to intercept the oil which passes along the shaft from the outer ends of the journals 50 and effect its projection into the chambers 54, from which it is returned through the passages 56 to the crank-case.

To enable a continuous feed of oil to the crank-case to be maintained during operation, an oil-reservoir, 58, having an upper supply-opening, 59, is fixed upon the lower cylinder-flanges in the space between the cylinders, so as to be inclosed entirely by the cylinders, valve-chamber, and cylinder-casing, and is provided with oil-feed pipes 60, having regulating-cocks 61, which discharge into the oil-cups 62 of the crank-shaft bearings. The capacity of the oil-reservoir is such as to enable it to receive at a single charge a supply of lubricant sufficient for a considerable period of operation of the engine, and by proper adjustment of the cocks 61 a slow and continuous feed is afforded without attention on the part of the operator. Lubrication of all the moving parts, except the pistons and valves, is thus effected from a single point, and the excess of oil, if any, supplied to the crank-shaft journals being returned to the case by the wipers on the crank-shaft, waste of oil is effectually prevented, and cleanliness of the engine and its surroundings correspondingly promoted.

I claim herein as my invention—

1. The combination, substantially as set forth, of a cylinder having its piston connected to a pin upon a crank-shaft, a closed case serving as a tank or receptacle for lubricating material, a main or distribution valve governing the supply and exhaust of the cylinder, and a centrifugal governor located within the case and coupled to an eccentric which actuates the valve.

2. The combination, substantially as set forth, of a pair of vertical single-acting cylinders, each located above and having its piston connected to the crank-pin of a double crank upon a common crank-shaft, a main or distribution valve working in a valve-chamber between said cylinders and governing the supply and exhaust thereof, and a centrifugal governor fixed upon the crank-shaft between its cranks, and coupled directly to an eccentric which reciprocates the main valve and is movable transversely relatively to the crank-line.

3. The combination, substantially as set forth, of a pair of vertical single-acting cylinders, each located above and having its piston connected to the crank-pin of a double crank upon a common crank-shaft, a differential piston main or distribution valve, operated by an eccentric on said shaft and governing the supply and exhaust of the cylinders, said valve having an upper piston of greater area than its lower piston, and a valve-chamber having a supply-pipe which admits steam between said pistons, these members being combined for joint operation to effect the balancing of the weight of the valve and eccentric by the excess of pressure on the larger valve-piston.

4. The combination, substantially as set forth, of a pair of vertical single-acting cylinders, each having a port for the admission and exhaust of steam at or near its upper end, pistons fitting said cylinders and connected to cranks on a common crank-shaft, and a water-relief passage leading from each of said cylinders to the exhaust-pipe, said passages having their openings to the bore of the cylinders located at such level therein as to be uncovered by the pistons when at the lowest extremity of their strokes.

5. The combination, substantially as set forth, of a pair of vertical single-acting cylinders located above a closed crank-case, and having their pistons coupled to cranks on a shaft rotating therein, a main or distribution valve governing the supply and exhaust of said cylinders, and a drain-pipe leading from the exhaust-passage of the main valve-chamber to the crank-case, and provided with a regulating cock or valve.

6. The combination, substantially as set forth, of a pair of vertical single-acting cylinders located above a closed crank-case, and having their pistons coupled to cranks on a shaft therein, a main valve working in a valve-chamber located between said cylinders and actuated by an eccentric on said shaft, an oil-reservoir fitting in the space between the cylinders and valve-chamber, and oil-supply pipes leading from said oil-reservoir to the oil-cups of the crank-shaft bearings.

In testimony whereof I have hereunto set my hand.

H. HERMAN WESTINGHOUSE.

Witnesses:
J. SNOWDEN BELL,
C. M. CLARKE.